United States Patent [19]

Wittmann et al.

[11] Patent Number: 4,563,282
[45] Date of Patent: Jan. 7, 1986

[54] WASTEWATER TREATMENT PLANT AND METHOD

[75] Inventors: John W. Wittmann, New Berlin; Robert C. Winkelman, Wales; Douglas F. Mooers, Glendale; Richard L. Davie, Oconomowoc, all of Wis.

[73] Assignee: Envirex Inc., Waukesha, Wis.

[21] Appl. No.: 623,480

[22] Filed: Jun. 22, 1984

[51] Int. Cl.⁴ ............................................. C02F 3/08
[52] U.S. Cl. ................................ 210/619; 210/621; 210/151; 210/195.1
[58] Field of Search ........ 210/619, 150, 151, 621–624, 210/195.1, 202, 203

[56] References Cited

U.S. PATENT DOCUMENTS

| Re. 29,970 | 4/1979 | Torpey | 210/619 |
| 3,557,954 | 1/1971 | Welch | 210/619 X |
| 3,799,515 | 3/1974 | Geerlings | 261/92 |
| 3,871,999 | 3/1975 | Torpey | 210/619 X |
| 4,093,539 | 6/1978 | Guarino | 210/619 |
| 4,330,408 | 5/1982 | McClure | 210/619 |

OTHER PUBLICATIONS

Pak-Shine Cheung et al., "Investigation to Replace the Conventional Sedimentation Tank by a Microstrainer in the Rotating Disc System", Water Research, vol. 14, pp. 67–75.

Primary Examiner—Thomas Wyse
Attorney, Agent, or Firm—Lawrence J. Crain

[57] ABSTRACT

A method and apparatus for increasing the capacity of an activated sludge wastewater treatment plant which utilizes microscreens in conjunction with rotating biological contactors that are placed in the primary settling tank, the aeration tank and the final clarification tank. A rotatable microscreen is placed upstream of the primary settling tank and downstream of the final clarification tank. The result is a more efficient and less energy consuming system which reduces the organic loads. Preferably, the microscreening preceding the biological treatment stage will have a mesh size in the range of about 50–200 mesh and the microscreen placed after the biological treatment stage will have a mesh size in the range of 6–44 microns. Additional benefits are obtained in recycling the treated water which is passed through the rotating biological contactor as well as utilizing it to aid in rotating the contactor. Another advantage of the system of this invention is that it can be readily adapted to an existing wastewater treatment plant in order to upgrade its capacity without substantially increasing capital investment and is adaptable to a new facility with benefits at low energy consumption and minimal land requirement.

14 Claims, 4 Drawing Figures

WASTEWATER TREATMENT PLANT AND METHOD

BACKGROUND OF THE INVENTION

This invention relates to an improved biological treatment of wastewater and provides a method and apparatus for upgrading the efficiency of existing wastewater treatment plants and for new facility construction. More specifically, the invention is concerned with employing microscreens or microstrainers, hereinafter referred to as "microscreens," both before and after treatment utilizing a rotatable, partially-submerged contactor in new or existing concrete tankage.

The use of microscreens in conjunction with a rotating biological contactor is described by Pak-Shing Cheung, et al., in *Water Research*, Volume 14, pages 67–75 "Investigation To Replace The Conventional Sedimentation Tank By A Microstrainer In The Rotating Disc System." It is also known in the wastewater treatment field to employ air driven rotating biological contactors as shown in U.S. Pat. No. 4,093,539. Further, the use of fluid including recirculating fluid to drive the rotating biological contactors is also well known.

SUMMARY OF THE INVENTION

Nowhere in the wastewater treatment art is there described the utilization of rotating microscreens preceding treatment with the rotating biological contactors as well as their use after such treatment wherein the initial rotatable microscreen is employed as substantially the sole means or method of removing primary solids and the rotatable microscreen placed after the rotating biological contactor is employed as substantially the sole means or method of secondary solids separation and in place of a final clarification tank and/or the final clarification tank combined with advanced secondary solids removal. While fine screens have been successfully employed for removing primary solids preceding a rotating biological contactor their employment both before and after the rotating biological contactors has not been utilized. In the instance where fine screens have been successfully employed for removing primary solids preceding rotating biological contactors the mesh sizes have not been in the range of 50–200 mesh.

It is an advantage of the present invention to provide an improved method for increasing the capacity of a wastewater treatment plant or improving the cost of new facilities wherein smaller facilities can be employed while maintaining the high capacity for the plant. Other advantages are in increasing the distribution of organic loading of the system to result in a more efficient useage of the rotating biological contactor; the use of recirculated waste treatment water in conjunction with the rotating biological contactors to approach a single stage operation and reduce the effective number of stages in series; distribution of recirculated flow from the rotating biological contactors to the downside of the contactors which will have air cups so as to aid in their rotation and recover pumping energy; a final solids separation which is accomplished using a microscreen instead of a conventional clarifier and/or clarification unit integrated with or followed by advanced secondary solids removal means; and an improved wastewater treatment process and apparatus which can be readily adapted to an existing wastewater treatment facility or utilized as a space and energy efficient treatment means for new facility construction.

The foregoing advantages and other advantages of this invention will appear in the following detailed description of the preferred embodiments of the invention.

BRIEF DESCRIPTION OF THE DRAWINGS

A better understanding of the present method and apparatus of this invention for wastewater treatment will be afforded by reference to the drawings wherein.

DESCRIPTION OF THE PREFERRED EMBODIMENTS

Figure 1:
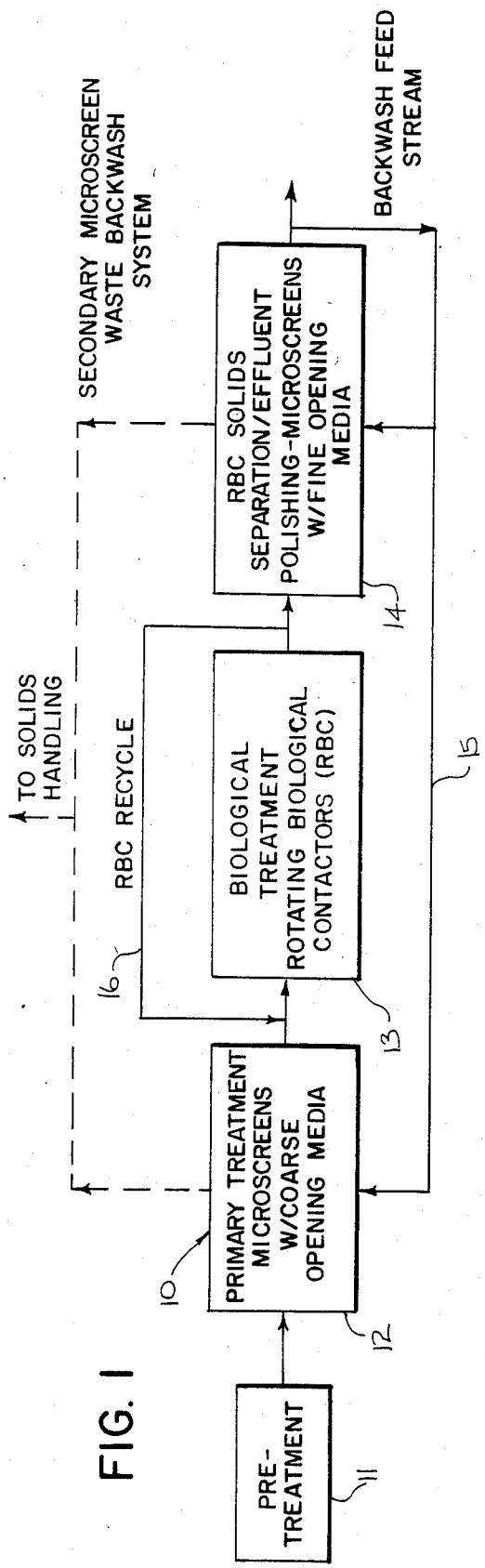
FIG. 1 is a diagramatic view of the process of the present invention as well as the apparatus employed therein.

Proceeding to a detailed description of the preferred embodiments of the present invention and particularly to FIG. 1, the biological waste treatment system generally 10 includes a pretreatment stage 11 wherein the raw effluent material will have been processed to remove therefrom large primary solid bodies, grit and possibly fats, oils and greases. The next stage is primary treatment with a coarse microscreen drum indicated by the numeral 12. After the initial microscreen treatment, the treated wastewater enters a biological treatment stage 13 where it will contact a series of rotating biological contactors such as will be later described in conjunction with FIG. 4. Subsequent to the biological treatment stage 13, the treated water will be subjected to a second microscreening process 14 after which the treated water will be of effluent quality and suitable, following disinfection, for return to a stream. It will be noted that in conjunction with the biological treatment stage 13 that a portion of the water treated with the rotating biological contactors could be recycled. This is indicated by the numeral 16 and also will be later described in conjunction with a description of FIG. 4 of the drawings. In addition, a backwash feed stream 15 is employed for the treated water leaving the microscreening stage 14 for purposes of backwashing the microscreen drums which will be more fully described in conjunction with FIG. 2 of the drawings.

Figure 2:
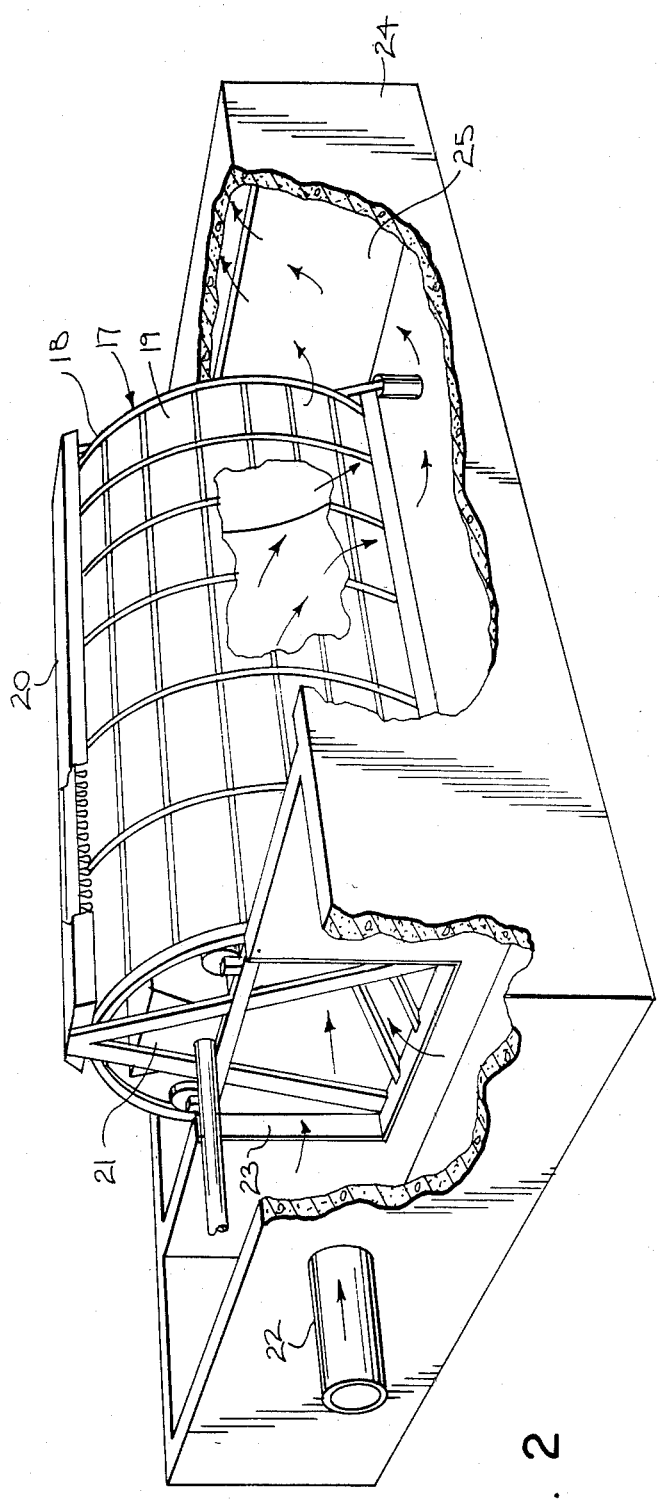
FIG. 2 is a perspective view depicting a microscreen drum which is utilized in the primary treatment and the rotating biological contactor solid separation treatment indicated in FIG. 1.

Referring to FIG. 2 a rotating microscreen apparatus generally 17 is described which will be employed in conjunction with both the primary treatment stage 12 and the rotating biological contractor solids separation stage 14. The major difference between the two apparatuses will be in the size of the screen employed in conjunction with the drum. The rotating microscreen is the subject of U.S. Pat. No. 4,038,187 the teaching of which is hereby incorporated by reference. The rotating microscreen apparatus 17 includes a rotatable drum 18 which is positioned for rotation over a horizontal axis and employs a multiplicity of microscreen grids 19. In this particular instance and when the rotating microscreen apparatus 17 is utilized in the primary treatment stage 12, the microscreen mesh size is approximately 100 mesh. A backwash header 20 is disposed at the top of the drum 18 and will be interconnected with the backwash feed stream 15, the means for connection is not specifically shown. A backwash receiving trough 21 is positioned inside the drum 18 for purposes of collecting and conveying away collected material. Inside the microscreen grid, an inlet pipe 22 will supply pretreated water into a tank 24 from where it will enter through inlet means 23 and out through the microscreen grids 19 in the manner indicated by the direction arrows. The microscreened water will flow out of the tank 24 by passing over the weir 25. As indicated earlier, this same rotating microscreen apparatus 17 will be employed in conjunction with the rotating biological contactor solid separation stage 14 except that the microscreen grid size will have a micron size of 21.

Figure 3:
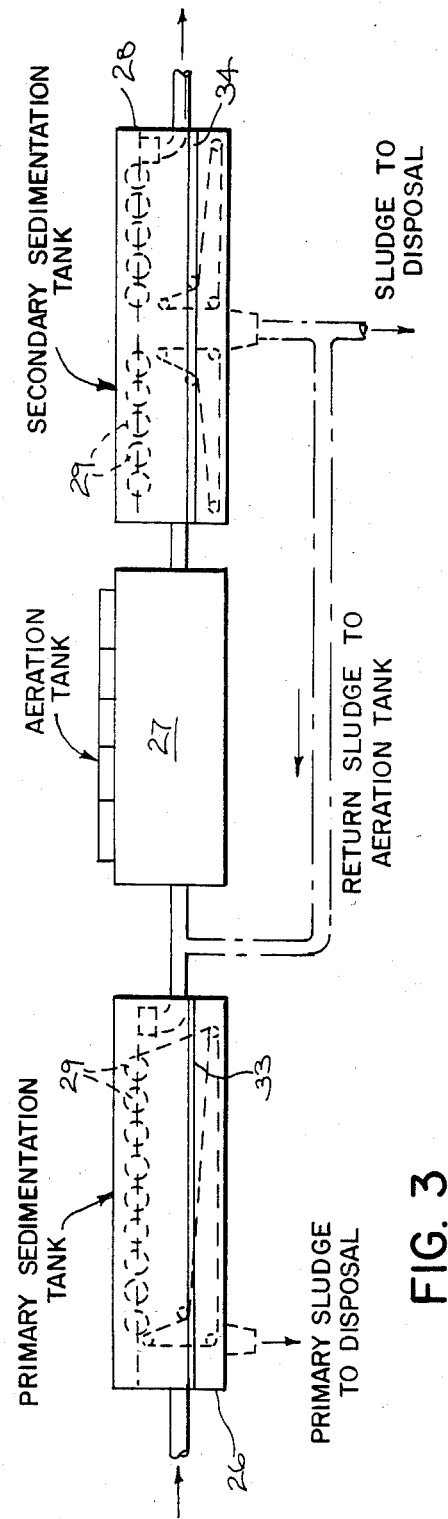
FIG. 3 is a diagramatic view illustrating the employment of rotating biological contactors as employed in upgrading an existing wastewater treatment facility stage indicated in FIG. 1.

As illustrated in FIG. 3, the biological treatment stage 13 is depicted. This stage will employ the usual primary settling or sedimentation tank 26, an intermediate aeration tank 27 and a final clarifier or sedimentation tank 28. All of the tanks will have rotatively mounted therein a plurality of the rotating biological contactors 29 of the type described in U.S. Pat. No. 4,093,539 which teaching is incorporated herein by reference. The broken line showing of the scraper collector in the primary sedimentation tank, the aerator in the secondary sedimentation tank as well as the sludge return and disposal lines are for illustration only and would not be employed in the upgraded system of this invention. The floor portions 33 and 34 would be substituted in their place in the tanks 26 and 28, respectively.

Figure 4:
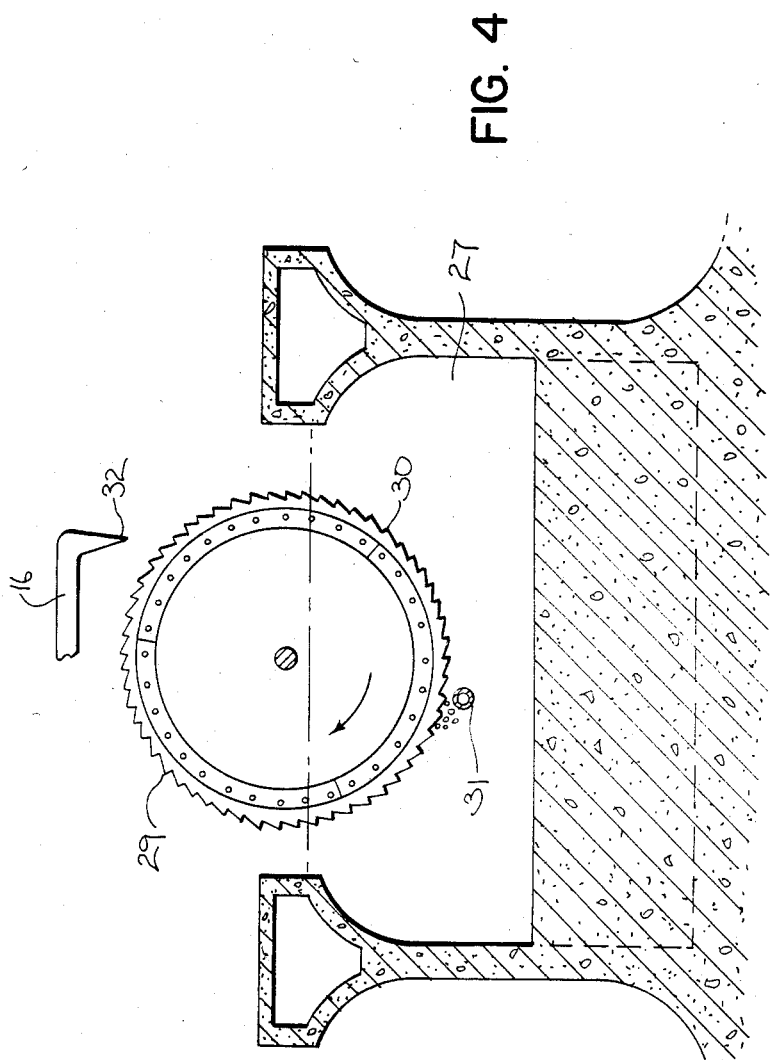
FIG. 4 is a diagramatic cross-sectional view of a portion of an aeration tank of an activated sludge treatment plant utilizing a rotating biological contactor which is employed in the biological treatment stage depicted in FIG. 1.

As best seen in FIG. 4, the rotative biological contactor 29 is shown partially submerged in the microscreened treated wastewater contained in the aeration tank 27 which could be modified as indicated with a raised floor. The rotatable biological contactor 29 will have on the surface thereof a series of pockets 30. These pockets will serve to entrap an oxygen containing gas which will be introduced from a pressurized air source pipe 31 for purposes of aiding and rotating the biological contactor 29. Optionally, also aiding in the rotation of the biological contactor 29 is recycled water which is previously treated from a rotating biological contactor 29 and will be pumped through the recycle line 16 and directed by a nozzle 32 so that it will also enter the pockets 30 as they rotate downwardly and away from nozzle 32 as indicated by the direction of the arrow of rotation in FIG. 4.

The advantages of the foregoing described method and biological waste treatment system 10 are seen in the use of the existing primary settling or sedimentation tank 26, the aeration tank 27 and the final clarifier or secondary sedimentation tank 29. It will be readily appreciated that the rotating microscreen drums 17 which will serve as the primary treatment stage 12 and the rotating biological contactor solid separation stage 14 can be readily interconnected to the biological treatment stage 13 by the usual inlet and outlet means and without employing special piping for interconnection. The use of air to drive the rotating biological contactors 29 affords ease of installation and maximum surface area in existing tank geometry. It will be appreciated that mechanical drives would require more tank space and complicate modifications. The use of existing tank structure minimizes construction costs and requires no increase in land area. Further, existing aeration blowers, if suitable, may be modified to efficiently supply low pressure air such as through air pipe 31 to drive the rotatable biological contactors 29. It would be further appreciated that in a fixed waste treatment system where tanks are already installed, straight-through flow primary tanks, aeration tanks and final tanks would impose excessive organic loads on the initial stages of the system. The cost effective solution is to pump rotating biological contactor effluent from the last stage to the rotating biological contactor influent. This recirculation is accomplished by pumping at sufficient rates such that the rotating biological contactor process approaches aeration as a single, fully mixed stage. The entire rotating biological contactor phase in this invention operates at nearly equal loads with nearly equal substrate concentrations throughout the system. The recirculation means would be to employ load head-high efficiency screw pumps (not shown).

It should be further pointed out that in utilizing the recirculation in the rotating biological contactor stage 13 and as indicated by recycle line 16 that a cost saving in energy of 10 to 15% saving can be effected as the returned wastewater is distributed to the down-rotation side of the rotating biological contactor 29 with cups or pockets 30 thus imparting additional rotational torque to the rotating biological contactor. Additional benefits are achieved through spreading the distribution of the circulating flow over a greater rotating biological contactor surface area. This hydraulic approach amounts to a degree of point-feeding or point dilution. It should be further pointed out that the use of the microscreen drum 17 in both the primary treatment stage 12 and the rotating biological contactor solid separation stage 14 results in improved solids removal while taking less space than would be required for adding conventional clarifiers for expansion purposes. This is indicated by the following Table presenting a statistical summary of field and plant laboratory data.

TABLE

| Parameter | Stage 12 | | Stage 13 | | | | Stage 14 | |
|---|---|---|---|---|---|---|---|---|
| | Infl. | Effl. | Infl. | Stage 1 | Stage 2 | Stage 3 | Infl. | Effl. |
| SBOD$_5$ (mg/l) | N.D. | 50 ± 20 | 50 ± 20 | 24 ± 8 | 14.0 ± 4.6 | N.D. | N.D. | 13.0 ± 4.2 |
| TBOD$_5$ (mg/l) | 127 ± 42 | 82 ± 26 | N.D. | N.D. | N.D. | 69 ± 15 | 64 ± 20 | 21 ± 6 |
| FLOW (GPM) | — | — | 95.1 ± 7.2 | — | — | — | — | — |
| FLOW (GPD/FT$^2$) | — | — | — | 13.10 | 4.97 | 10.70 | — | — |
| D.O. (mg/l) | 3.5 ± 1.2 | 4.0 ± 0.7 | 5.7 ± 0.9 | 5.3 ± 1.2 | 5.6 ± 1.6 | 6.6 ± 1.2 | 9.0 ± 0.6 | 9.2 ± 0.7 |
| pH (standard units) | 6.9 ± 0.2 | 7.0 ± 0.2 | 7.1 ± 0.2 | 7.2 ± 0.2 | 7.3 ± 0.2 | 7.1 ± 0.2 | 7.2 ± 0.2 | 7.3 ± 0.2 |
| TSS (mg/l) | 127 ± 27 | 60 ± 12 | 57 ± 11 | 90 ± 36 | 111 ± 37 | 96 ± 18 | 83 ± 24 | 16 ± 3 |
| VSS (mg/l) | N.D. | 48 ± 10 | 46 ± 9 | 72 ± 32 | 89 ± 29 | 73 ± 14 | 64 ± 19 | 13 ± 3 |

In explanation of the above Table it should be pointed out that the Stages 12, 13 and 14 correspond to those previously explained in conjunction with FIG. 1. The Stage 1, Stage 2 and Stage 3 designations represent the rotating biological contactors 29 in the primary sedimentation tank 26, the aeration tank 27 and the secondary sedimentation tank 28, respectively. The designations under the "Parameter" column should be readily apparent, however, for purposes of clarity the following is offered: $SBOD_5$ means soluble biochemical oxygen demand; $TBOD_5$ means total biochemical oxygen demand; D.O. means dissolved oxygen; TSS means total suspended solids and VSS means volatile suspended solids. It should be further pointed out that in Stage 12 and Stage 14 the micron screen material for the respective rotating drums was 149 (100 mesh) and 21 micron screen material, respectively. The data presented in the above Table indicates that a secondary microscreen final effluent of 30 mg/l $TBOD_5$ and 30 mg/l SS is readily obtained. These low concentrations permit a microscreen drum 17 to be used in the rotating biological contactor stage 14 in lieu of conventional clarifiers for secondary solids separation. This results in less land usage; more positive solids capture, and in certain applications, installed costs up to 20 to 40% less than conventional clarifiers. Considering the foregoing described advantages relating to energy usage, a net primary energy savings of at least 20% can be effected in some installations.

In the foregoing description, the preferred mesh size for the coarse rotatable microscreen drum employed in conjunction with primary treatment stage 12 is a mesh size of 100. If desired, this mesh size could be in the range of about 50-200. Similarly, while a microscreen size of 21 was indicated for the rotating fine microscreen drum employed in conjunction with the rotating biological contactor solid separation stage 14, this can range from 6-44 microns, the requirement being that the screen openings for the coarse microscreen drum ultilzed in stage 12 be coarser or greater than for the fine microscreen drum employed in stage 14. The use of finer opening media on the secondary microscreen could permit the removal of contaminants to a level commonly refered to as advanced secondary, advanced waste, or tertiary treatment. A plurality of rotating biological contactors 29 are indicated in conjunction with the biological treatment stage 13 as shown in the primary sedimentation tank 26, the aeration tank 27 and the secondary sedimentation tank 28. Any number of such rotatable biological contactors can be employed with only one such contactor being utilized in each tank if desired and can be placed parallel with the longitudinal axis of the tank 27, as shown in FIG. 4, or optionally, transversly thereto. To exemplify the versatility of the system of this invention, it can be adapted to an existing waste treatment facility which may include the following conventional wet stream process trains: fine screens, aeration tanks and final clarifiers; primary sedimentation, fixed film reactors and secondary sedimentation; or fine screens, fixed film reactors and secondary sedimentation. Further, while the wastewater treatment system of this invention is readily adaptable to an existing waste treatment facility, it is obvious that it is readily suitable to a new facility with cost savings still being achieved.

It will thus be seen that through the present method and apparatus of this invention there is now accomplished a more efficient method for treating wastewater resulting in the utilization of much smaller wastewater treatment facilities. The apparatus of this invention lends itself to ready adaptation to existing wastewater treatment plants thus requiring little additional capital investment. Further, in the use of recycling systems and pressurized oxygen containing gas to rotate the rotatable biological contactors, energy is saved. All of the foregoing are accomplished in conjunction with the utilization of microscreen stages before and after the biological treatment stage which effects a lessening of the primary solids load on the system thus resulting in a more efficient wastewater treatment operation.

In view of the possible modifications, the invention is not intended to be limited by the showing or description herein, or in any other manner, except insofar as may specifically be required.

We claim:
1. A method of wastewater treatment comprising:
introducing wastewater into a first rotating microscreen drum having a relatively course mesh size on the order of 50 to 100 mesh as substantially the sole form of removal of primary solids;
passing said microscreened water through at least one rotating biological contactor;
introducing said water subsequent to said treatment with said rotating bioligical contactor through a second rotating microscreen drum as substantially the sole form of secondary solids separation and without the use of clarification tanks, and said secondary microscreen drum having a relatively fine mesh size on the order of 6 to 44 microns; and
said mesh sizes of said first and second rotating microscreens being of relative coarseness so that a sufficient amount of primary solids is removed by said first microscreen drum in order that the amount of secondary solids remaining will not cause excessive solids loading on said second microscreen drum.

2. The method of claim 1 further comprising:
recycling water which is passed through said rotating biological contactor back to said rotating biological contactor.

3. The method of claim 2 further comprising:
recycling water introduced in conjunction with said rotating biological contactor so as to aid in rotating said contactor.

4. The method of claim 1 further comprising:
providing a first microscreen drum with mesh size on the order of 100 mesh and a second microscreen drum with a mesh size on the order of 21 microns.

5. The method of claim 1 further comprising;
passing said microscreen water through said rotating bioligical contactor by passing said microscreen water into a primary tank, an aeration tank, and a secondary sedimentation tank operatively housing at least one biological contactor in each of said tanks.

6. The method of claim 1 further comprising:
pretreating said wastewater now to substantially remove primary solids which cannot be effectively removed by said first rotating microscreen drum prior to introduction into said first rotating microscreen drum.

7. A biological waste treatment system comprising:
a first screening treatment tank having a relatively coarse-mesh rotatable microscreen drum operatively mounted therein as substantially the sole form of primary solids separation and having a mesh size on the order of from 50 to 200 mesh;
at least one additional treatment tank having a rotating biological contactor operatively mounted therein;

a second screening treatment tank having a relatively fine-mesh rotatable microscreen drum operatively mounted therein as substantially the sole form of secondary solids separation and having a mesh size on the order of from 6 to 44 microns;

said mesh sizes of said first and second rotating microscreens being of relative coarseness so that a sufficient amount of primary solids is removed by said first microscreen drum in order that the amount of secondary solids remaining will not cause excessive solids loading on said second microscreen drum; and fluid inlet and outlet means constructed and arranged to permit the passage of wastewater into said first screening treatment tank, said additional treatment tank and said second screening treatment tank in said stated order.

8. The biological waste treatment system of claim 7 including means to recycle a portion of said water treated in said second treatment tank to said rotating biological contactor.

9. The biological waste treatment system of claim 8 wherein there is included with said additional treatment tank at least two additional treatment tanks having at least one rotating biological contactor operatively mounted therein, said additional treatment tanks represented by a primary sedimentation or settling tank, an aeration tank and a secondary sedimentation or final clarification tank.

10. The biological waste treatment system of claim 8 further including means to introduce an oxygen containing gas in a manner to aid in rotating said contactor.

11. The biological waste treatment system of claim 7 wherein said coarse-mesh rotatable microscreen drum has a mesh size of about 100 mesh and said fine-mesh rotatable microscreen drum has a mesh size of about 21 microns.

12. An upgraded wastewater treatment plant including a primary sedimentation or settling tank, an aeration tank and a secondary sedimentation or final clarification tank, said wastewater treatment plant comprising:

said primary settling tank being adapted to contain a relatively corase-mesh rotatable microscreen drum operatively mounted therein to serve as substantially the sole form of primary solids separation, said drum having a mesh size on the order of from 50 to 200 mesh;

at least one rotating bioligical contactor operatively mounted in each of said primary sedimentation tank, said aeration tank and said final clarification tank;

said secondary sedimentation tank being adapted to contain a relatively fine-mesh rotatable fine miscroscreen drum mounted therein to serve as substantially the sole form of secondary solids separation and having a mesh size on the order of from 6 to 44 microns;

said mesh sizes of said first and second rotating microscreen drum being of relative coarseness so that a sufficient amount of primary solids is removed by said first microscreen drum in order that the amount of secondary solids remaining will not cause excessive solids loading on said second microscreen drum; and fluid inlet and outlet means constructed and arranged to connect said first screening treatment tank to said primary sedimentation tank and said final clarification tank to said second screening treatment tank.

13. The upgraded wastewater treatment plant of claim 12 further including means to recycle a portion of said water treated in said final clarification tank to said aeration tank.

14. The upgraded wastewater treatment plant of claim 13 further including means to introduce an oxygen containing gas, and with both said recycled water and said gas introduced in a manner to aid in rotating said contactor.

* * * * *